United States Patent [19]

Chan

[11] 3,944,607

[45] Mar. 16, 1976

[54] HERBICIDAL N-(N'-ALKYNYLCARBAMYLMETHYL)-2,6-DIALKYL-α-HALOACETANILIDES

[75] Inventor: David Cheong King Chan, San Francisco, Calif.

[73] Assignee: Chevron Research Company, San Francisco, Calif.

[22] Filed: Oct. 17, 1974

[21] Appl. No.: 515,781

[52] U.S. Cl. .............................. 260/558 A; 71/118
[51] Int. Cl.² ................... A01N 9/20; C07C 103/28
[58] Field of Search ................... 260/558 A; 71/118

[56] References Cited
UNITED STATES PATENTS

| 3,475,157 | 10/1969 | Olin | 71/118 |
| 3,481,979 | 12/1969 | Horrom et al. | 260/558 A |
| 3,640,699 | 2/1972 | Horrom et al. | 71/118 |
| 3,829,306 | 8/1974 | Ratts | 71/118 X |

FOREIGN PATENTS OR APPLICATIONS

| 1,217,374 | 12/1970 | United Kingdom | 71/118 |

*Primary Examiner*—Allen B. Curtis
*Attorney, Agent, or Firm*—G. F. Magdeburger; Dix A. Newell; Raymond Owyang

[57] ABSTRACT

N-(N'alkynylcarbamylmethyl)-2,6-dialkyl-α-haloacetanilides have herbicidal activity, particularly in pre-emergent applications against grassy weeds.

9 Claims, No Drawings

HERBICIDAL N-(N'-ALKYNYLCARBAMYLMETHYL)-2,6-DIALKYL-α-HALOACETANILIDES

DESCRIPTION OF THE PRIOR ART

Belgium Pat. No. 73/03363 of Hercules published Feb. 7, 1973, discloses N-α-haloacetyl-substituted N-phenyl amines and their use as herbicides.

U.S. Pat. Nos. 3,547,620 and 3,637,847 of J. F. Olin and U.S. Pat. No. 3,780,090 of Akita et al. disclose the use of α-haloacetanilides as herbicides.

DESCRIPTION OF THE INVENTION

The N-(N'-alkynylcarbamylmethyl)-2,6-dialkyl-α-haloacetanilide compounds of the invention are represented by the formula (I):

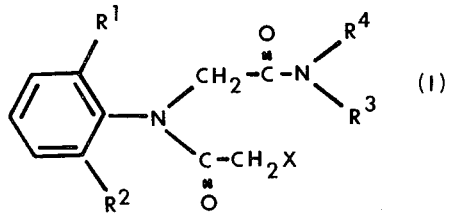

wherein $R^1$ and $R^2$ individually are lower alkyl groups of 1 to 6 carbon atoms, $R^3$ is hydrogen, lower alkyl of 1 to 6 carbon atoms, lower haloalkyl of 1 to 2 carbon atoms and 1 to 4 chlorine or bromine, or lower alkynyl of 3 to 6 carbon atoms; $R^4$ is lower alkynyl of 3 to 6 carbon atoms; and X is fluorine, chlorine, bromine or iodine.

Representative alkyl groups which $R^1$, $R^2$ and $R^3$ may represent include methyl, ethyl, propyl, isopropyl, butyl, secbutyl, t-butyl, pentyl, isohexyl, hexyl, etc. Representative haloalkyl groups which $R^3$ may represent include chloromethyl, dichloromethyl, tribromomethyl and tetrachloroethyl. Representative alkynyl groups which $R^3$ and $R^4$ may represent include propargyl, 2-butynyl, 3-pentynyl, etc.

Preferably $R^1$ and $R^2$ are alkyl of 1 to 3 carbon atoms, $R^3$ is hydrogen or alkyl of 1 to 3 carbon atoms, $R^4$ is 2-alkynyl, and X is chlorine or bromine.

Representative compounds of Formula (I) are:

N-(N'-propargylcarbonylmethyl-2,6-dimethyl-α-chloroacetanilide

N-(N'-propargylcarbamylmethyl)-2,6-diethyl-α-chloroacetanilide

N-(N',N'-dipropargylcarbamylmethyl)-2,6-dimethyl-α-chloroacetanilide

N-(N'-2-butynylcarbamylmethyl)-2,6-diisopropyl-α-bromoacetanilide

N-(N'-3-hexynylcarbamylmethyl)-2,6-dimethyl-α-fluoroacetanilide

N(N'-propargyl-N'-chloromethylcarbamylmethyl-2,6-dimethyl-α-bromoacetanilide

N-(N'propargyl-N'-isopropylcarbamylmethyl)-2,6-dimethyl-α-iodoacetanilide and

N-(N'-2-butynyl-N'-methylcarbamylmethyl)-2-methyl-6-ethyl-α-chloroacetanilide.

The compounds of the invention may be prepared by alkylating a 2,6-dialkylaniline (II) with an α-halcamide (III) to produce an N-carbamylmethyl-2,6-dialkylaniline (IV) and subsequently acylating the N-carbamylmethyl-2,6-dialkylamine (IV) with an α-haloacetyl halide (V) to give the N-carbamylmethyl-2,6-dialkyl-α-haloacetanilide product (I). This sequence of reactions is depicted by the following equations:

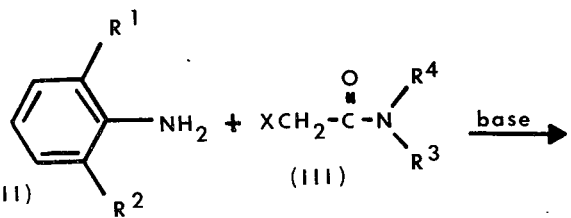

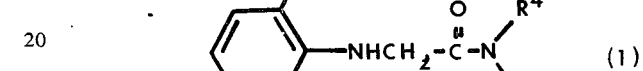

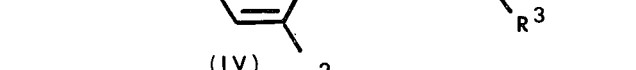

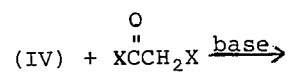

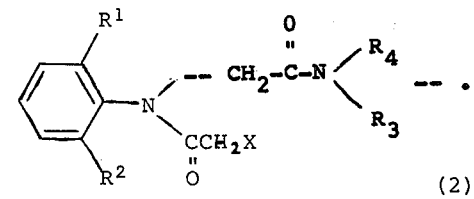

wherein $R^1$, $R^2$, $R^3$, $R^4$ and X have the same significance as previously defined.

The alkylation reaction (1) is conducted in the presence of a base. Suitable bases are inorganic alkali metal carbonates such as sodium carbonate or potassium carbonate. Generally, substantially equimolar amounts of reactants (II) and (III) and the base are employed. The reaction is conducted in inert polar organic solvents, e.g., apolar diprotic solvents such as dimethylformamide and acetonitrile, at reaction temperatures varying from 0°C. to 90°C., preferably from 20°C. to 50°C. The reaction pressure may be atmospheric, subatmospheric, or superatmospheric. However, for convenience of conducting the reaction, the pressure is generally atmospheric. The reaction time will, of course, vary depending upon the reactants and the reaction temperature. Generally the reaction time is from 0.25 to 24 hours. The product (IV) is generally purified by conventional procedures, e.g., extraction, distillation or crystallization, before use in the acylation reaction (2).

The acylation reaction (2) is conducted by conventional procedures in the presence of an organic base such as a trialkyl amine or a pyridine compound. The reactants (IV) and (V) and the base are generally contacted in substantially equimolar amounts in an inert organic solvent at a temperature of 0°C. to 50°C. Suitable inert organic solvents include ethyl acetate, methylene chloride, dimethoxyethane, benzene, etc. The product is isolated and purified by conventional procedures such as extraction, distillation, chromatography, crystallization, etc.

The preparation of the compounds of the invention is illustrated by the following examples.

EXAMPLES

EXAMPLE 1

Preparation of
N-(N'-propargyl-N'-methyl-carbamylmethyl)-2,6-dimethyl-α-chloroacetanilide

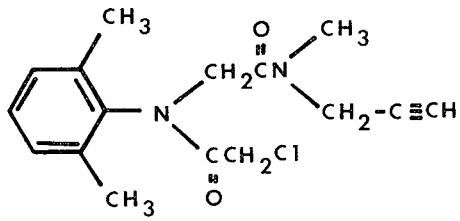

A solution of 13.8 g (0.2 mol) of N-methylpropargylamine in 20 ml methylene chloride was added dropwise to a stirred and cooled (below 15°C.) solution of 40.2 g (0.2 mol) bromoacetyl bromide and 16 g (0.2 mol) sodium bicarbonate in 250 ml methylene chloride. The reaction mixture was allowed to warm to about 25°C. and stirred for 2 hours. The reaction mixture was then filtered and evaporated under reduced pressure to give an oily residue. The residue was diluted with 150 ml ether to form a two-phase mixture consisting of an ether phase and a dark oil. The ether phase was separated, dried over magnesium sulfate, and evaporated to give 32.3 g of N-methyl-N-propargyl-α-bromoacetamide.

A mixture of 16.2 g (0.085 mol) N-methyl-N-propargyl-α-bromoacetamide (prepared above), 10.2 g (0.085 mol) 2,6-dimethylaniline and 8.9 g (0.085 mol) sodium carbonate in 200 ml dimethylformamide was heated at 140°C. for 14 hours. The reaction mixture was diluted with 300 ml water and extracted with benzene. The benzene extracts were washed with water, dried over magnesium sulfate and evaporated under reduced pressure to give a viscous oil. The oil was chromatographed on a silica-gel column. N-(N'-methyl-N'-propargylcarbamylmethyl)-2,6-dimethylaniline was eluted from the column with 50:50 hexane-ethyl ether.

A sample of 3.2 g (0.029 mol) chloroacetyl chloride was added dropwise to a stirred and warmed (45°–50°C.) solution of 6.6 g (0.029 mol) N-(N'-methyl-N'-propargylcarbamylmethyl)-2,6-dimethylaniline (prepared above) and 2.3 g (0.029 mol) pyridine in 250 ml of methylene chloride. The reaction mixture was stirred at about 25°C. for 1 hour. The reaction mixture was washed with 250 ml water, with aqueous sodium bicarbonate and then water, dried over magnesium sulfate and evaporated under reduced pressure to give a viscous oil. The oil was crystallized from ether to give the product, N-(N'-methyl-N'-propargylcarbamylmethyl)-2,6-dimethyl-α-chloroacetanilide, as a colorless solid, m.p. 72–74°C. Elemental analysis for $C_{16}H_{19}ClN_2O_2$ showed: %Cl, calculated 11.6, found 11.8.

By a procedure similar to that above:

(a) α-chloroacetyl chloride and N-(N'-methyl-N'-propargylcarbamylmethyl)-2,6-diethylaniline were reacted in the presence of pyridine to produce N-(N'-methyl-N'-propargylcarbamylmethyl)-2,6-diethyl-α-chloroacetanilide as a colorless solid, m.p. 69°–70°C. Elemental analysis for $C_{18}H_{23}ClN_2O_2$ showed: %Cl, calc. 10.6, found 10.5.

(b) α-chloroacetyl chloride and N-(N'-1,1-dimethyl-2-propynylcarbamylmethyl)-2,6-diethylaniline were reacted in the presence of pyridine in ethyl acetate to produce N-(N'-1,1-dimethyl-2-propynylcarbamylmethyl)-2,6-diethyl-α-chloroacetanilide as a white solid, m.p. 114°–115°C. Elemental analysis for $C_{19}H_{25}ClN_2O_2$ showed: %Cl, calc. 10.2, found 10.1 The structural formula of this product is:

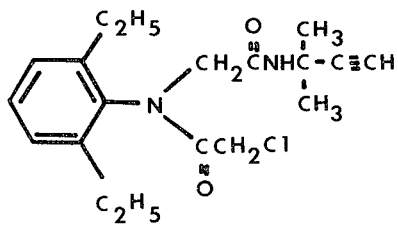

(c) α-chloroacetyl chloride and N-(N'-1,1-dimethyl-2-propynylcarbamylmethyl)-2,6-dimethylaniline were reacted in the presence of pyridine in ethyl acetate to produce N-(N'-1,1-dimethyl-2-propynylcarbamylmethyl)-2,6-dimethyl-α-chloroacetanilide as a white solid, m.p 100°–102°C. Elemental analysis for $C_{17}H_{21}ClN_2O_2$ showed: %Cl, calc. 11.0, found 11.1.

(d) α-chloroacetyl chloride and N-(N'-propargylcarbamylmethyl)-2,6-dimethylaniline were reacted in the presence of pyridine to produce N-(N'-propargylcarbamylmethyl)-2,6-dimethyl-α-chloroacetanilide as a white solid, m.p. 89°–94°C. Elemental analysis for $C_{15}H_{17}ClN_2O_2$ showed: %Cl, calc. 12.1, found 11.0.

UTILITY

The compounds of the present invention are, in general, herbicidal in both pre- and post-emergent applications. For pre-emergent control vegetation, undesirable vegation, the herbicidal compounds will be applied in herbicidally effective amounts to the locus or growth medium of the vegetation, e.g., soil infested with seeds and/or seedlings of such vegetation. Such application will inhibit the growth of or kill the seeds, germinating seeds and seedlings. For post-emergent applications, the herbicidal compounds will be applied directly to the foliage and other plant parts. Generally, the herbicidal compounds of the invention are effective against weed grasses as well as broadleaved weeds. The compounds are particularly effective as pre-emergent herbicides against broadleaf and grass weeds with little or no phytotoxicity to crops such as oats, sorghum, cotton and peas.

The compounds of the present invention can be used alone as herbicides. However, it is generally desirable to apply the compounds in herbicidal compositions comprising one or more of the herbicidal compounds intimately admixed with a biologically inert carrier. The carrier may be a liquid diluent or a solid, e.g., in the form of dust powder or granules. In the herbicidal composition, the active herbicidal compounds can be from about 0.01 to 95 percent by weight of the entire composition.

Suitable liquid diluent carriers include water and organic solvents, e.g., hydrocarbons such as benzene, toluene, kerosene, diesel oil, fuel oil, and petroleum naphtha. Suitable solid carriers are natural clays such as kaolinite, atalpulgite, and montmorillonite. In addition, talcs, pyrophillite, diatomaceous silica, synthetic fine silicas, calcium aluminosilicate and tricalcium phosphate are suitable carriers. Organic materials such as walnut-shell flour, cottonseed hulls, wheat flour, wood flour or redwood-bark flour may also be used as solid carriers.

The herbicidal composition will also usually contain a minor amount of a surface-active agent. Such surface agents are those commonly known as wetting agents, dispersing agents and emulsifying agents, and can be anionic, cationic or nonionic in character. The herbicidal compositions may also contain other pesticides, adjuvants, stabilizers, conditioners, fillers, and the like.

The amount of herbicidal compound or composition administered will vary with the particular plant part or plant growth medium which is to be contacted, the general location of application — i.e., sheltered areas such as greenhouses, as compared to exposed areas such as fields — as well as the desired type of control. Generally for both pre- and post-emergent control, the herbicidal compounds of the invention are applied at rates of 0.2 to 60 kg/ha, and the preferred rate is in the range 0.5 to 40 kg/ha.

Pre-emergent herbicidal tests on representative compounds of the invention were made using the following method:

Pre-Emergent Test

An acetone solution of the test compound was prepared by mixing 750 mg of the compound, 220 mg of a nonionic surfactant and 25 ml of acetone. This solution was added to approximately 125 ml of water containing 156 mg of surfactant.

Seeds of the test vegetation were planted in a pot of soil and the test solution was sprayed uniformly onto the soil surface at a dose of 33 micrograms/cm$^2$. The pot was watered and placed in a greenhouse. The pot was watered intermittently and was observed for seedling emergence, health of emerging seedlings, etc., for a 3-week period. At the end of this period, the herbicidal effectiveness of the compound was rated based on the physiological observations. A 0-to-100 scale was used, 0 representing no phytotoxicity, 100 representing complete kill. The results of these tests appear in Tables I, II and III.

TABLE I

| Example No. | Dosage | Herbicidal Effectiveness | | | | | |
|---|---|---|---|---|---|---|---|
| | | O | W | C | M | P | L |
| 1 | 33 mcg/cm$^2$ | 100 | 100 | 100 | 55 | 100 | 50 |
| 2a | 33 mcg/cm$^2$ | 100 | 100 | 100 | 10 | 50 | 0 |
| 2b | 33 mcg/cm$^2$ | 0 | 100 | 60 | 0 | 0 | 0 |
| 2c | 33 mcg/cm$^2$ | 98 | 100 | 98 | 0 | 0 | 0 |

O = Wild Oats (*Avena fatua*)
W = Watergrass (*Echinochloa crusgalli*)
C = Crabgrass (*Digataria Sanguinalis*)
M = Mustard (*Brassica arvensis*)
P = Pigweed (*Amaranthus retroflexus*)
L = Lambsquarter (*Chenopodium album*)

TABLE II

| Example No. | Dosage | Herbicidal Effectiveness | | | | | |
|---|---|---|---|---|---|---|---|
| | | Grass Weeds | | | | Crops | |
| | | Watergrass | Crabgrass | Yellow Foxtail | Wheat | Oats | Sorghum |
| 1 | 0.7 mcg/cm$^2$ | 100 | 70 | 70 | 7 | 2 | 0 |

TABLE III

| No. | Dosage | Herbicidal Effectiveness | | | | |
|---|---|---|---|---|---|---|
| | | Broadleaf Weeds | | | Crops | |
| | | Pigweed | Vetch | Peas | Cotton | Soybeans |
| 1 | 4.4 mcg/cm$^2$ | 100 | 97 | 5 | 0 | 10 |

What is claimed is:
1. A compound of the formula

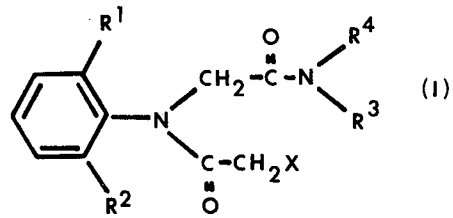

wherein R$^1$ and R$^2$ individually are alkyl of 1 to 6 carbon atoms; R$^3$ is hydrogen, alkyl of 1 to 6 carbon atoms, haloalkyl of 1 to 2 carbon atoms and 1 to 4 chlorine or bromine atoms, or alkynyl of 3 to 6 carbon atoms; R$^4$ is alkynyl of 3 to 6 carbon atoms; and X is fluorine, chlorine, bromine or iodine.

2. The compound of claim 1 wherein R$^3$ is hydrogen and R$^1$ and R$^2$ are alkyl of 1 to 3 carbon atoms.

3. The compound of claim 2 wherein X is chlorine or bromine.

4. The compound of claim 3 wherein R$^4$ is 2-alkynyl.

5. The compound of claim 4 wherein R$^4$ is propargyl.

6. The compound of claim 1 wherein $R^1$, $R^2$ and $R^3$ individually are alkyl of 1 to 3 carbon atoms.

7. The compound of claim 6 wherein X is chlorine or bromine.

8. The compound of claim 2 wherein $R^4$ is 2-alkynyl.

9. The compound of claim 8 wherein $R^1$, $R^2$ and $R^3$ are methyl, $R^4$ is propargyl and X is chlorine.

* * * * *